(12) United States Patent
Bravet et al.

(10) Patent No.: US 8,835,543 B2
(45) Date of Patent: *Sep. 16, 2014

(54) COMPOSITE MATERIALS HAVING IMPROVED THERMAL PERFORMANCE

(71) Applicant: Saint-Gobain Ceramics & Plastics, Inc., Worcester, MA (US)

(72) Inventors: David J. Bravet, Westborough, MA (US); Olivier Guiselin, Dayton, OH (US); Gwo S. Swei, Vandalia, OH (US); Yves Boussant-Roux, Avignon (FR)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/747,941

(22) Filed: Jan. 23, 2013

(65) Prior Publication Data
US 2013/0131237 A1    May 23, 2013

Related U.S. Application Data

(62) Division of application No. 11/955,858, filed on Dec. 13, 2007, now Pat. No. 8,383,702.

(60) Provisional application No. 60/871,047, filed on Dec. 20, 2006.

(51) Int. Cl.
| | |
|---|---|
| C08K 5/5357 | (2006.01) |
| C08K 5/42 | (2006.01) |
| C08K 5/41 | (2006.01) |
| C08K 5/5333 | (2006.01) |
| C08K 5/521 | (2006.01) |
| C08K 3/22 | (2006.01) |
| C08K 9/04 | (2006.01) |

(52) U.S. Cl.
CPC .............. *C08K 5/5357* (2013.01); *C08K 5/42* (2013.01); *C08K 5/41* (2013.01); *C08K 5/5333* (2013.01); *C08K 5/521* (2013.01); *C08K 3/22* (2013.01); *C08K 9/04* (2013.01)
USPC ........... 524/132; 524/130; 524/145; 524/166; 524/167

(58) Field of Classification Search
CPC ........ C08K 5/5357; C08K 5/41; C08K 5/521; C08K 5/5333
USPC ........................................................ 532/210
See application file for complete search history.

(56) References Cited

U.S. PATENT DOCUMENTS

| | | |
|---|---|---|
| 2,915,475 A | 12/1959 | Bugosh |
| 3,108,888 A | 10/1963 | Bugosh |
| 3,661,628 A | 5/1972 | Marsden |
| 4,265,801 A | 5/1981 | Moody et al. |
| 4,936,867 A | 6/1990 | Guttierrez et al. |
| 5,096,830 A | 3/1992 | Senyei et al. |
| 5,750,620 A | 5/1998 | Davies et al. |
| 5,973,049 A | 10/1999 | Bieser et al. |
| 6,103,803 A | 8/2000 | Cheung et al. |
| 6,139,960 A | 10/2000 | Styron et al. |
| 6,242,098 B1 | 6/2001 | Styron et al. |
| 6,382,538 B1 | 5/2002 | Nippa et al. |
| 6,939,584 B2 | 9/2005 | Sankey et al. |
| 6,949,289 B1 | 9/2005 | Lawton et al. |
| 2003/0119963 A1 | 6/2003 | Nippa et al. |
| 2005/0124745 A1 | 6/2005 | Bauer et al. |
| 2006/0289841 A1 | 12/2006 | Ito et al. |
| 2008/0138622 A1 | 6/2008 | Guiselin et al. |
| 2008/0171811 A1 | 7/2008 | Guiselin et al. |

FOREIGN PATENT DOCUMENTS

| | | |
|---|---|---|
| CA | 2381963 A1 | 2/2001 |
| CN | 1193026 A | 9/1998 |
| CN | 1517398 A | 8/2004 |
| CN | 1583859 A | 2/2005 |
| EP | 1293531 A1 | 3/2003 |
| EP | 1736503 A2 | 12/2006 |
| JP | 57-168954 A | 10/1982 |
| JP | 62101644 A | 5/1987 |
| JP | 6216346 A | 7/1987 |
| JP | 63221169 A | 9/1988 |
| JP | 1131259 A | 5/1989 |
| JP | 1131260 A | 5/1989 |
| JP | 1131261 A | 5/1989 |
| JP | 1131262 A | 5/1989 |
| JP | 2284942 A | 11/1990 |
| JP | 4296404 A | 10/1992 |
| JP | 5287135 A | 11/1993 |
| JP | 6080798 A | 3/1994 |
| JP | 8277379 A | 10/1996 |
| JP | 10156998 A | 6/1998 |
| JP | 11080383 A | 3/1999 |
| JP | 2000143996 A | 5/2000 |
| JP | 2000144581 A | 5/2000 |
| JP | 2003054941 A | 2/2003 |
| JP | 2003082170 A | 3/2003 |
| JP | 2004331713 A | 11/2004 |
| JP | 2006-193339 A | 7/2006 |
| JP | 2007-031684 A | 2/2007 |
| KR | 950015144 B1 | 12/1995 |
| WO | 0112708 A1 | 2/2001 |
| WO | 2005118924 A1 | 12/2005 |
| WO | 2008070520 A1 | 6/2008 |

OTHER PUBLICATIONS

Ciullo et al.; "The Rubber Formulary," Williams Andrew, Inc.; 1999; p. 28.
"Phosphoric Acid," Wikipedia, the Free Encyclopedia, Sep. 23, 2009, 7 pages. <http://en.wikipedia.org/wiki/Phosphoric_acid>.
"Phosphonate," Wikipedia, the Free Encyclopedia, Aug. 10, 2009, 3 pages. <http://en.wikipedia.org/wiki/Phosphonic_acid>.
"Hypophosphorous Acid," Wikipedia, the Free Encyclopedia, Jul. 19, 2009, 3 pages. <http://en.wikipedia.org/wiki/Phosphinic_acid>.
"BET Theory," Wikipedia, the Free Encyclopedia, Jul. 6, 2009, 3 pages. <http://en.wikipedia.org/wiki/BET_theory>.

(Continued)

*Primary Examiner* — Doris Lee
(74) *Attorney, Agent, or Firm* — Mike W. Crosby; Abel Law Group, LLP

(57) ABSTRACT

A composite material includes a non-polar polymer and alumina hydrate particulate. The composite material has a Heat Distortion Performance of at least about 10% relative to the non-polar polymer absent the alumina hydrate particulate. The composite material may include a coupling agent including a phosphinic acid group, a phosphonic acid group or an ester derivative thereof.

21 Claims, No Drawings

COMPOSITE MATERIALS HAVING IMPROVED THERMAL PERFORMANCE

CROSS REFERENCE TO RELATED APPLICATIONS

The present application is a divisional of U.S. Non-Provisional patent application Ser. No. 11/955,858, filed Dec. 13, 2007, entitled "COMPOSITE MATERIALS HAVING IMPROVED THERMAL PERFORMANCE", naming inventors David J. Bravet, Olivier Guiselin, Gwo S. Swei and Yves Boussant-Roux, which claims priority from U.S. Provisional Patent Application No. 60/871,047, filed Dec. 20, 2006, entitled "COMPOSITE MATERIALS HAVING IMPROVED THERMAL PERFORMANCE", naming inventors David J. Bravet, Olivier Guiselin, Gwo S. Swei and Yves Boussant-Roux, which application is incorporated by reference herein in its entirety.

FIELD OF THE DISCLOSURE

This disclosure, in general, relates to composite materials having improved thermal performance.

BACKGROUND

Non-polar polymers are widely used in various applications, including automotive components, building materials, packaging, carpets, or other molded or extruded articles. In particular, non-polar polyolefins are widely used in high volume applications and provide chemical resistance at a low cost. Such polyolefins can be used alone, but are typically used in combination with additives or reinforcement fillers, such as glass fibers, talc, calcium carbonate, or wood fibers.

However, the use of non-polar polymers, and in particular, polyolefins has been limited in thermally demanding applications because of poor heat performance or temperature performance. In particular, polyolefins, such as polypropylene, exhibit a low heat distortion temperature. As a result, manufacturers have turned to other polymers, such as polar polymers, when seeking to manufacture articles with temperature resistance and high heat distortion temperatures. Specifically, manufacturers have avoided using non-polar polyolefins in applications that require good mechanical properties at higher temperatures. Such applications include automotive applications under the hood or packaging applications for hot liquids.

However, typical polar polymers used in such applications tend to be more expensive and can be more difficult to process. For example, silicone and nylon hoses, nylon hose fittings, polyurethane belts, and polyimide engine shields are increasingly being used in automotive applications. Silicone, polyurethane, and nylon polymers are typically more expensive than polyolefins, such as polyethylene and polypropylene. In addition to being more expensive, thermally stable polyimides are generally thermoset polymers and as such, are typically more difficult to mold into a desired article than a polyolefin.

As such, an improved composite material would be desirable.

SUMMARY

In a particular embodiment, a composite material includes a non-polar polymer and alumina hydrate particulate. The composite material has a Heat Distortion Performance of at least about 10% relative to the non-polar polymer absent the alumina hydrate particulate, where the Heat Distortion Performance is defined as the percent increase in heat distortion temperature relative to the base polymer without additives.

In another exemplary embodiment, a composite material includes a non-polar polyolefin, alumina hydrate particulate, and a coupling agent. The alumina hydrate particulate has a longest particle dimension not greater than about 300 nm and an aspect ratio of at least about 3:1. The composite material exhibits a heat distortion temperature at least about 10° C. greater than a heat distortion temperature of the non-polar polyolefin absent the alumina hydrate particulate.

In a further exemplary embodiment, a method of forming a composite material includes mixing a non-polar polymer and an alumina hydrate particulate having a longest average particle dimension not greater than about 300 nm and a $C_{BET}$ value not greater than about 110. The alumina hydrate particulate has a coupling agent bonded to the surface. The coupling agent has a phosphonic group. The method further includes melt processing the mixture.

In an additional embodiment, a method of forming a particulate filler for use in polymer composite materials includes dissolving a phosphorous-containing coupling agent in a solvent to form a coupling agent solution; adding the coupling agent solution to a mixture including alumina hydrate particulate having a longest average particle dimension not greater than about 300 nm, an aspect ratio of at least about 3:1, and a $C_{BET}$ value of at least about 150; and drying the mixture to form the particulate filler.

DESCRIPTION OF THE EMBODIMENTS

In a particular embodiment, a composite material includes a non-polar polymer and a ceramic particulate. The composite material has a Heat Distortion Performance of at least about 10% relative to the same non-polar polymer absent the ceramic particulate. Heat Distortion Performance is the percent increase in heat distortion temperature relative to the base polymer without additives. In an example, the ceramic particulate includes alumina hydrate particulate. The non-polar polymer can include a polyolefin, such as a crystalline polyolefin, including, for example, polypropylene. In addition, the composite material may include a coupling agent, such as a coupling agent including a polar functional group. The polar functional group may include a phosphonic acid group or an ester derivative thereof.

In a further exemplary embodiment, a method of forming a composite material includes mixing a non-polar polymer and an alumina hydrate particulate. The alumina hydrate particulate has a longest average particle dimension not greater than about 300 nm and a $C_{BET}$ value not greater than about 110. The alumina hydrate particulate may have a coupling agent bonded to its surface. In an example, the coupling agent may have a phosphonic group or an ester derivative thereof. In addition, the method also may include melt processing the mixture.

In an exemplary embodiment, the non-polar polymer is a polymer that does not include polar functional groups extending from the backbone of the polymer. An exemplary non-polar polymer includes an olefinic polymer, such as a polyolefin homopolymer or co-polymer. An example of a polyolefin homopolymer includes polyethylene, polypropylene, polybutene, polypentene, or polymethylpentene, or any combination thereof. An exemplary polyethylene includes high-density polyethylene (HDPE), medium-density polyethylene (MDPE), low-density polyethylene (LDPE), ultra low-density polyethylene, or any combination thereof. An exemplary polyolefin co-polymer includes ethylene propylene co-polymer, ethylene butene co-polymer, ethylene octene copolymer, olefinic terpolymers, or any combination thereof. In general, the term olefinic polymer does not include diene elastomers as used herein. In a particular example, the non-polar polymer includes polypropylene.

The polyolefin may have a degree of crystallinity. For example, the polyolefin may have at least about 35% crystallinity. In a particular example, the polyolefin may have a crystallinity of at least about 50%, such as at least about 60%, or even at least about 70% crystallinity. In a particular example, the polyolefin may be a high-crystalline polyolefin. Alternatively, the polyolefin may be a low-crystallinity polyolefin, having a crystallinity not greater than about 35%. An exemplary commercially available polyolefin includes Equistar 8540, an ethylene octene copolymer; Equistar GA-502-024, an LLDPE; Dow DMDA-8904NT 7, an HDPE; Basell Pro-Fax 6301, a polypropylene; Basell Pro-Fax SR275M, a random polypropylene copolymer; Dow 7C50, a block polypropylene copolymer; or products formerly sold under the tradename Engage by DuPont Dow. Another exemplary polyolefin includes Exxon Mobil Exact 0201 or Dow Versify 2300. In a particular example, the crystalline polyolefin may include polypropylene.

In an exemplary embodiment, the ceramic particulate may include a metal oxide. For example, the ceramic particulate may include silica, alumina, alumina silicate, ceria, zirconia, hydrates thereof, or any combination thereof. In a particular example, the ceramic particulate includes aluminous particulate, such as an alumina or alumina hydrate particulate.

In general, the alumina hydrate particulate material includes hydrated alumina conforming to the formula: $Al(OH)_aO_b$, where $0<a\leq 3$ and $b=(3-a)/2$. In general, the alumina hydrate particulate material has a water content of about 1% to about 38% by weight, such as about 15% to about 38% water content by weight. In a particular embodiment, the alumina hydrate particulate material is free of non-alumina ceramic materials, and, in particular, is free of silica and aluminosilicate materials. By way of example, when a=0 the formula corresponds to alumina ($Al_2O_3$).

Alumina hydrate particulate materials can include aluminum hydroxides, such as ATH (aluminum tri-hydroxide), in mineral forms known commonly as gibbsite, bayerite, or bauxite, or can include alumina monohydrate, also referred to as boehmite. Such mineral form aluminum hydroxides can form alumina hydrate particulate material.

According to an embodiment, the alumina hydrate particles have an aspect ratio, defined as the ratio of the longest dimension to the next longest dimension perpendicular to the longest dimension, generally at least about 2:1, and, in particular, at least about 3:1, such as at least about 4:1, or at least about 6:1. Particular embodiments have relatively elongated particles, such as at least about 8:1, at least about 10:1, and, in particular examples, at least about 14:1.

With particular reference to the morphologies of the alumina hydrate particles, different morphologies are available, such as needle-shaped, ellipsoidal-shaped, and platelet-shaped particles. For example, particles having a needle-shaped morphology may be further characterized with reference to a secondary aspect ratio defined as the ratio of the second longest dimension to the third longest dimension perpendicular to the first and second longest dimensions. The secondary aspect ratio of a needle-shaped particle is generally not greater than about 3:1, typically not greater than about 2:1, or not greater than about 1.5:1, and oftentimes about 1:1. For a needle-shaped particle, the secondary aspect ratio generally describes the cross-sectional geometry of the particles in a plane perpendicular to the longest dimension. It is noted that since the term aspect ratio is used herein to denote the ratio of the longest dimension to the next longest dimension, it may be referred as the primary aspect ratio.

According to another embodiment, the alumina hydrate particle can be a platy or platelet-shaped particle generally of an elongated structure having a primary aspect ratios described above in connection with the needle-shaped particles. However, platelet-shaped particle generally has opposite major surfaces, the opposite major surfaces being generally planar and generally parallel to each other. In addition, the platelet-shaped particle may be characterized as having a secondary aspect ratio greater than that of needle-shaped particles, generally at least about 3:1, such as at least about 6:1, or at least about 10:1. Typically, the shortest dimension or edge dimension, perpendicular to the opposite major surfaces or faces, is generally less than 50 nanometers, such as less than about 40 nanometers, or less than about 30 nanometers.

According to another embodiment, a cluster of platelet-shaped particles can generally form an elongated ellipsoidal structure having a primary aspect ratio described above in connection with the needle-shaped particles. In addition, the ellipsoidal-shaped cluster may be characterized as having a secondary aspect ratio not greater than about 2:1, not greater than about 1.5:1, or about 1:1.

In an exemplary embodiment, the alumina hydrate particulate has an average agglomerate size not greater than about 30 microns. Agglomerates are defined herein as an adhered set of alumina particles. For example, the alumina hydrate particulate may have an average agglomerate size not greater than about 25 microns, such as not greater than about 20 microns, or even not greater than about 15 microns.

Individual alumina hydrate particles may have an average longest particle dimension not greater than about 2000 nm. For example, the average largest particle dimension may be not greater than about 1000 nm, such as not greater than about 500 nm. In particular, the average largest particle dimension may be not greater than about 300 nm, such as in a range between about 50 nm to about 300 nm. Due to process constraints of certain embodiments, the smallest average particle size is generally at least about 75 nanometers, such as at least about 100 nanometers, or at least about 135 nanometers.

Due to the elongated morphology of the particles, conventional characterization technology is generally inadequate to measure average particle size, since characterization technology is generally based upon an assumption that the particles are spherical or near-spherical. Accordingly, average particle size was determined by taking multiple representative samples and physically measuring the particle sizes found in representative samples. Such samples may be taken by various characterization techniques, such as by scanning electron microscopy (SEM). The term average particle size also denotes primary particle size, related to the individually identifiable particles, whether dispersed or agglomerated forms. Of course, agglomerates have a comparatively larger average particle size.

In addition to aspect ratio and average particle size of the alumina hydrate particulate material, morphology of the particulate material may be further characterized in terms of specific surface area. Herein, the $C_{BET}$ value and the specific surface area of the particulate material relates to specific surface area as measurable by the commonly available BET technique. In an exemplary embodiment, the $C_{BET}$ value of the unmodified alumina hydrate particulate material is at least about 120, such as at least about 150. According to embodiments herein, the alumina hydrate particulate material has a specific surface area, generally not less than about 10 m$^2$/g, such as not less than about 20 m$^2$/g, at least about 30 m$^2$/g, or not less than about 40 m²/g. Since specific surface area is a function of particle morphology as well as particle size, generally the specific surface area of embodiments is not greater than about 250 m²/g, such as not greater than about 200 m²/g or not greater than about 100 m²/g. In particular, the surface area may be about 50 m²/g to 250 m²/g. In an exemplary embodiment, needle shaped alumina hydrate particulate has a specific surface area of about 100 m²/g to about 250 m²/g. In another exemplary embodiment, platelet-shaped alumina hydrate particulate has a specific surface area of about 50 m²/g to about 98 m²/g.

In the context of seeded aluminous particulate material, particular significance is attributed to the seeded processing pathway, as not only does seeded processing to form seeded particulate material allow for tightly controlled morphology of the precursor (which is largely preserved in the final product), but also the seeded processing route is believed to manifest desirable physical properties in the final product, including compositional, morphological, and crystalline distinctions over particulate material formed by conventional, non-seeded processing pathways.

Additional characterization studies were carried out to more precisely understand the effect of seeding on particle morphology. The seeded particles have a nodular structure, in that the particles are 'bumpy' or 'knotty' and have a generally rough outer texture. Further characterization was carried out by TEM analysis to discover that what appears by SEM to be generally monolithic particles, the particles are actually formed of tight, dense assemblies of platelet particles. The particles have a controlled aggregate morphology, in that the aggregates display a level of uniformity beyond conventional aggregate technologies. It is understood that the controlled aggregate structures form the nodular structure, and are unique to the seeded approach discussed above.

It is recognized that non-seeded approaches have been found to form particulate material, including approaches that decompose raw materials through consumption of an aluminum salt, such as aluminum nitrate or aluminum sulfate. However, these metal salt decomposition approaches form morphologically distinct particulates that are devoid of the seeded morphology, notably lacking the nodular structure. Typical non-seeded morphology has a smooth or hair-like outer surface texture. Examples of such non-seeded approaches include those disclosed in U.S. Pat. No. 3,108,888, U.S. Pat. No. 2,915,475, and JP2003-054941.

The ceramic particulate may be modified with a coupling agent. In a particular example, the ceramic particulate may include a coupling agent bonded to the surface thereof. The coupling agent may have at least one hydrocarbon group that can modify the interaction of the ceramic particulate with the non-polar polymer. For example, the hydrocarbon group may include a hydrocarbon chain group, such as an alkyl group or a cyclic hydrocarbon group, such a benzyl group. In a particular example, the hydrocarbon group may include a benzyl group. In another example, the hydrocarbon group can include a long-chain alkyl group, such as an alkyl group having at least about 9 carbons, for example, about 9 carbons to about 25 carbons. In addition, the coupling agent may include a polar functional group configured to interact with the ceramic particulate. For example, the polar group may include a titanate, a zirconate, a phosphinic acid group, a phosphate, a phosphonate, a phosphonic acid group, a sulphonic acid group, a sulfinic acid group, a carboxylic acid group, a silane, or an ester derivative thereof, or any combination thereof. In a particular example, the polar functional group includes a phosphonic acid group or an ester derivative thereof. For example, the polar functional group may include a phosphonic acid group. In another example, the polar functional group may include a mono-ester derivative of a phosphonic acid group.

In particular, a coupling agent having a combination of a phosphonic acid group or an ester derivative thereof with one of a long chain alkyl group, a cyclic alkyl group, or a benzyl group provides improved properties to a polymer blend incorporating a filler modifier with such a coupling agent. In a particular example, a coupling agent including a phosphonic acid group and a benzyl group, such as phenyl-phosphonic acid (PPA), provides improved properties. In a further example, a coupling agent, such as octyl phosphonic acid (OPA) or octyl (2-ethylhexyl) acid phosphate (OAP), may provide improved properties. In another exemplary embodiment, a coupling agent including an ester derivative of a phosphonic acid group and a long-chain alkyl group, such as monoester derivative of a long chain alkyl phosphonate, provides improved properties. For example, the long chain alkyl phosphonate may have at least 15 carbons, such as 15-20 carbons in the alkyl chain.

In a particular embodiment, a coupling agent may be reacted with the ceramic particulate prior to mixing the ceramic particulate with the non-polar polymeric material to form the composite material. Alternatively, the ceramic particulate, coupling agent, and non-polar polymeric material, can be mixed together in various orders to form the composite material.

In a particular example, the coupling agent is added in proportion to the surface area of the ceramic material. For example, the composite material may include coupling agent in an amount of about 1.0 micromoles/m² to about 10 micromoles/m² based on the surface area of the ceramic particulate. In a particular example, the coupling agent may be included in an amount of at least about 2.0 micromoles/m², such as about 2.0 micromoles/m² to about 6.0 micromoles/m², or about 5.0 micromoles/m² to about 6.0 micromoles/m² based on the surface area of the ceramic particulate.

In a particular embodiment, the ceramic particulate is treated with a coupling agent to form a particulate filler. For example, the coupling agent may be dissolved in a solvent to form a coupling agent solution. The solvent can include a polar solvent, such as water for water-soluble coupling agents. In another example, the coupling agent can be dissolved in a polar solvent, such as an alcohol, including ethanol, isopropanol or combinations thereof. The coupling agent solution may be added to a mixture including a ceramic particulate. In a particular example, a ceramic particulate may be included in a sol or may be dispersed within a solution, such as an aqueous solution. Alternatively, the coupling agent solution may be added to a dry ceramic particulate.

The solution including the ceramic particulate and the coupling agent may be mixed and heated to facilitate interaction between the coupling agent and the surface of the ceramic particulate. In a particular example, the solution is mixed under high-shear conditions and treated at a temperature not greater than the boiling point the solvent in which the coupling agent and ceramic particulate are dispersed. Alternatively, the solution may be treated at a temperature greater than the boiling point of the solvent. In a particular example, the ceramic particulate and coupling agent solution is heated to a temperature between about 70° C. and 100° C. Alternatively, other methods of drying the materials, such as freeze drying or spray drying, may be used.

After sufficient treatment time (e.g., 1 to 6 hours), the solution including the treated ceramic particulate may be dried. For example, the treated ceramic particulate may be dried for a period of between 12 and 36 hours at a temperature greater than the boiling point of the solvent in which the treated particulate was dispersed. For example, the treated particulate may be dried at a temperature greater than about 100° C. in a batch oven.

In an example, the dried particulate may be crushed to a desired size. For example, the dried particulate may be crushed to a size with a mesh having an aggregate size not greater than about 30 microns.

In a particular example, the treated particulate may have a desirable $C_{BET}$ value. For example, the untreated ceramic particulate may have a $C_{BET}$ value of at least about 120. In a particular example, the treated particulate filler may have a $C_{BET}$ value not greater than about 110, such as not greater than about 80. In particular, the $C_{BET}$ value may be not greater than about 60, such as not greater than about 30 or even as low as about 15.

In an exemplary embodiment, the particulate filler may be compounded with the non-polar polymer to form the composite material. For example, the composite material may include about 1 wt. % to about 50 wt. % of the particulate filler based on the total weight of the composite. In a further example, the composite material may include treated particulate filler in an amount between about 3 wt. % and about 20 wt. %, such as an amount between about 3 wt. % and about 10 wt. %.

In a particular example, the composite material may be formed by mixing a non-polar polymer and the particulate material. For example, the particulate material may include a treated alumina hydrate particulate having a longest average particle dimension not greater than about 300 nm and a $C_{BET}$ value not greater than about 110. The alumina hydrate particulate has a coupling agent bonded to the surface thereof. The coupling agent may include a phosphonic group.

To form the composite material, a mixture of the non-polar polymer and the treated ceramic particulate may be melt processed. For example, the mixture may be treated in a Brabender mixer or in a twin-screw extruder at temperatures suitable for processing the non-polar polymeric material.

In a particular example, the composite material exhibits improved temperature performance. For example, the composite material may exhibit an improved heat distortion temperature (HDT). In an exemplary embodiment, the composite material has a heat distortion temperature (HDT) at least about 10° C. greater than the heat distortion temperature (HDT) of the non-polar polymer absent the treated ceramic particulate. In a further exemplary embodiment, the composite material may exhibit an HDT of at least about 20° C. greater than the HDT of the non-polar polymer absent the particulate filler. As such, the composite material exhibits an improved Heat Distortion Performance (HDP). Heat Distortion Performance (HDP) is defined as the percent increase in heat distortion temperature (HDT) relative to that of the base polymer without treated particulate filler. For example, the HDP of the composite material may be at least about 10% relative to the non-polar polymer absent the treated ceramic particulate. In particular, the HDP may be at least about 15%, such as at least about 30%.

In addition, the composite material may exhibit improved mechanical properties at elevated temperature, such as an improved flexural modulus. In a particular example, the composite material exhibits an improved Flexural Performance at elevated temperatures. The static flexural modulus at 90° C. was measured by a three point bending test in an oven set at 90° C. For example, the Flexural Performance may be defined as the percent increase in static flexural modulus at 90° C. relative to the non-polar polymer absent the treated ceramic particulate. In a particular example, the ceramic material exhibits a Flexural Performance of at least about 13%, such as at least about 30%.

The composite material may also exhibit improved mechanical properties at elevated temperature, such as an improved dynamic flexural relaxation modulus measured by DMA under constant force during a temperature sweep cycle at of 2° C./min. In a particular example, the composite material exhibits an improved dynamic flexural relaxation modulus at elevated temperatures. For example, the Dynamic Flexural Relaxation Performance may be defined as the percent increase in dynamic flexural relaxation modulus at 90° C. relative to the non-polar polymer absent the treated ceramic particulate, i.e., $100 \times (\text{Modulus}_{composite} - \text{Modulus}_{polymer})/\text{Modulus}_{polymer}$. In a particular example, the composite material may exhibit a Dynamic Flexural Relaxation Performance of at least about 100%, such as at least about 200%.

In another exemplary embodiment, the improvement in mechanical properties at elevated temperatures may be quantified by the temperature at which the dynamic flexural relaxation modulus of the composite material drops below the dynamic flexural relaxation modulus of the non-polar polymer when measured at a particular temperature. A Dynamic Flexural Relaxation Temperature Performance may be defined as the temperature at which the dynamic flexural relaxation modulus of the composite material drops below the dynamic flexural relaxation modulus of the non-polar polymer measured at 40° C. For example, if the modulus of the non-polar polymer at 40° C. is 500 MPa, the Dynamic Flexural Relaxation Temperature Performance is the temperature at which the modulus of the composite is equal to 500 MPa. In an example, the Dynamic Flexural Relaxation Temperature Performance may be at least about 70° C., such as at least about 80° C., or even about 85° C.

The composite material also may exhibit improved degradation properties when submitted to a thermal stress. For example, the Half deGradation Temperature (HGT) may be defined as the temperature at which the composite loses 50% of its weight when tested using thermal gravimetric techniques. The degradation properties may be determined by measuring the composite weight loss by TGA during a heating ramp from room temperature to 800° C. at a rate of 10° C./min. The HGT Performance may be defined as the increase in the half degradation temperature (HGT) relative to that of the base polymer without the ceramic particulate. In a particular embodiment, the composite material may exhibit a HGT Performance of at least about 10° C., such as at least about 30° C., at least about 45° C., or even, at least about 60° C.

In a particular example, the composite material includes a non-polar polyolefin and an alumina hydrate particulate treated with a coupling agent. The treated alumina hydrate particulate may have a longest particle dimension not greater than about 300 nm and an aspect ratio of at least about 3:1. In particular, the composite material may exhibit a heat distortion temperature of at least about 10° C. greater than the heat distortion temperature of the non-polar polyolefin absent the alumina hydrate particulate. Further, the alumina hydrate particulate may have a $C_{BET}$ value of not greater than about 110.

Particular embodiments of the composite material advantageously exhibit improved thermal performance and thus, can be used in thermally demanding applications in which the base non-polar polymer may not be used. In particular, coupling agents including phosphonic acid based or ester derivatives thereof and including a long-chain alkyl or benzyl group provide improved thermal performance in non-polar polymeric materials incorporating fillers modified with such coupling agents. As such, the composite material may provide a lower cost alternative to traditional polar polymers used in such applications.

EXAMPLES

Example 1

Surface Treatment Process

Particulate filler samples are prepared from CAM9080, an alumina hydrate available from Saint-Gobain Ceramics and Plastics, Inc., and a coupling agent. The coupling agent is selected from PPA (available from Aldrich), octyl phosphonic acid (OPA) (available from Rhodia), and CYANEX 272 (available from CYTEC).

The surface treatment is performed in a 4 liter glass reactor. Approximately 1200 cc of a solution (CAM9080) comprising approximately 10% per weight of nano-boehmite platelets with a specific surface area around 80 $m^2$/gram is introduced into the reactor. The coupling agent is dissolved in 50 to 200 cc of water or a water soluble dispersing agent such as iso-propanol, and is added to the solution in amounts approximately equivalent to 2, 3, or 6 micromoles/$m^2$ of nano-boehmite surface area.

The solution is mixed for approximately 3 hours using a high shear mixer at 1200 RPM. The pH is adjusted to approximately 5 periodically during the mixing and the temperature is maintained at approximately 80° C.

After approximately 3 hours, the solution is removed from the reactor and dried for approximately 24 hours at 110° C. in a batch oven. The dried powder is crushed and sized with a mesh to have an aggregate size of approximately 30 microns or less.

The $C_{BET}$ value and the specific surface area of the dried powder are measured to evaluate the effect of the surface treatment on the boehmite particles, and more specifically the impact on surface polarity. The non-treated particles have a high $C_{BET}$ value (>150) due to their high polarity. The treated particles exhibit a $C_{BET}$ value lower than about 80 and as low as 19, indicating that the treated particles are less polar and more compatible with non-polar polymers such as polypropylene. TABLE 1. illustrates the $C_{BET}$ values of treated particles for different species of coupling agent. In addition to the coupling agents listed in Table 1, monoester derivatives of long-chain alkyl phosphonic acids and in particular, monoester derivatives of long chain alkyl phosphonic acids having about 15-20 carbons in the alkyl chain show promise as coupling agents, exhibiting $C_{BET}$ values between 18.8 and 73.5 for grafting densities between 2 and 6 micromoles/$m^2$, respectively.

TABLE 1

Surface Properties of Treated Particles

| Coupling agent | Grafting density (μmol/$m^2$) | $C_{BET}$ value |
|---|---|---|
| PPA | 2 | 103.8 |
| | 3 | 96.3 |
| | 6 | 58.6 |
| Cyanex 272 | 2 | 18.9 |
| | 3 | 17.7 |
| | 6 | 15.5 |
| OPA | 2.1 | 65.8 |
| | 5.3 | 43.7 |

Example 2

Compounding

Samples are prepared by compounding polypropylene (Profax 6301 available from BASELL) with one of CAM9080, CAM9080 treated with approximately 6 micromoles/$m^2$ PPA in accordance with EXAMPLE 1, CAM9080 treated with approximately 6 micromoles/$m^2$ CYANEX 272 in accordance with EXAMPLE 1, nano-boehmite treated with OS-2 (a sulfonic acid based coupling agent) available from SASOL, CAM9080 treated with approximately 2.1 micromoles/$m^2$ OPA, or CAM9080 treated with 3 micromoles/$m^2$ octyl (2-ethylhexyl) acid phosphate (OAP).

The particulate filler and polypropylene are compounded without additional additives in a 25 mm twin screw extruder to produce pellets. The die temperature is set to 220° C. For each of the samples, weight loading of particulate filler is 6%. The pellets are injection molded to produce standard ASTM slabs. In addition, a standard ASTM slab of polypropylene without particulate filler is formed.

Example 3

Thermal Performance Testing

Dynamic Mechanical Analysis (DMA) is used to determine the heat distortion temperature similar to an ASTM method (e.g., ASTM D648 used to measure the Heat Distortion Temperature of polymers) and half degradation temperature (HGT) is determined for samples. The dynamic flexural relaxation modulus is measured on impact bars at various temperatures at constant heating rate. TA Instruments 2800 Dynamic Mechanical Analyzer (S/N 0800-0161) with a dual cantilever test fixture is used to test the samples. The samples are in the form of rectangular bar with length of around 60 mm, width of around 12.75 mm and depth of around 3.25 mm. The span length of the sample in the fixture is 35 mm, and the thickness and width of the testing discs is measured for each sample.

A static force of 2.4 N is applied by the dual cantilever fixture to generate a fiber stress of 66 psi on the top and bottom surfaces of the bending bars. The sample is subjected to heating at a rate of 2° C./min in a temperature rage between about 30° C. and about 150° C. The strain of the sample under a constant stress is monitored and the temperature at which the strain reaches 0.2% is the heat distortion temperature (HDT) of the material.

The following tables, Table 2, Table 3, Table 4, and Table 5, summarize the temperature performance and the HGT of the samples. The following samples were tested:

PP: sample of pure polypropylene;
Virgin CAM: sample of polypropylene compounded with 6% of non treated nano-boehmite particles (CAM9080) having a specific surface area of 80 $m^2$/gram;
Cyanex: polypropylene compounded with 6% of CAM9080 treated with 6 micromoles/$m^2$ Cyanex;
OPA: PP compounded with 6% of CAM9080 treated with 3 micromoles/$m^2$ OPA;
OAP: PP compounded with 6% of CAM9080 treated with 3 micromoles/$m^2$ OAP;
PPA: PP compounded with 6% of CAM9080 treated with 6 micromoles/$m^2$ PPA; and
OS-2: nano-boehmite produced by SASOL and treated by SASOL with approximately 5-6 micromoles/$m^2$ OS-2, a sulfonic acid based coupling agent.

TABLE 2

Heat Distortion Temperatures

| Particulate Filler/<br>Coupling Agent | Heat Distortion<br>Temperature (° C.) | Heat Distortion<br>Performance (%) |
|---|---|---|
| PP | 80.4 | N/A |
| Virgin CAM | Not Determined | Not Determined |
| OS-2 | 81.5 | 1.3 |
| Cyanex | 90.9 | 13.0 |
| PPA | 125.2 | 55.7 |

Table 2 illustrates the heat distortion temperature (HDT) and Heat Distortion Performance (HDP) for surface modified alumina hydrate compounded with polypropylene. The OS-2 sample exhibited very little improvement in HDT or HDP. Cyanex exhibits an HDT improvement of approximately 9° C. and an HDP of approximately 13.0%. In another example not illustrated in Table 2, monoester derivatives of alkyl phosphonic acids having about 15-20 carbons in the alkyl chain exhibit an HDT increase of approximately 15° C. versus virgin polypropylene and an HDP of approximately 19.5%. In both the Cyanex samples and samples formed from derivatives of alkyl phosphonic acids, SEM scans show that the individual particles are well dispersed.

A composite of polypropylene and alumina hydrate modified with PPA shows a significant increase in HDT of 45° C. and an HDP of approximately 55.7%. Surprisingly, dispersion of the PPA modified boehmite in polypropylene is weak and agglomerates of 10 to 30 micron are observed. Consequently, dispersion may not be a dominant factor influencing mechanical properties.

TABLE 3

Dynamic flexural relaxation modulus (MPa) Change with Temperature

| Filler/<br>Coupling<br>Agent | Temperature (° C.) | | | | | | | | | |
|---|---|---|---|---|---|---|---|---|---|---|
| | 30 | 40 | 50 | 60 | 70 | 80 | 90 | 100 | 110 | 120 |
| None | 750 | 500 | 442 | 410 | 400 | 220 | 140 | 92 | 60 | 43 |
| Virgin CAM | 1000 | 800 | 762 | 719 | 590 | 300 | 190 | 137 | 100 | 75 |
| OS-2 | | 700 | 642 | 590 | 420 | 250 | 120 | 70 | 44 | 30 |
| Cyanex | 1000 | 645 | 602 | 530 | 420 | 320 | 220 | 147 | 89 | 52 |
| PPA | | 1000 | 900 | 705 | 600 | 525 | 490 | 424 | 350 | 270 |

TABLE 4

Static Flexural modulus measurement at 90° C.

| Filler/Coupling<br>agent | Flex mod at<br>90° C. (MPa) | Percentage<br>improvement |
|---|---|---|
| None | 575 | 0% |
| Virgin CAM | 614 | 7% |
| PPA | 813 | 41% |
| OPA | 780 | 35% |

As illustrated in Table 3, virgin polypropylene dynamic flexural relaxation modulus decreases rapidly as the temperature increases. At 70° C., the dynamic flexural relaxation modulus is only 50% of the dynamic flexural relaxation modulus at room temperature, and at 90° C. the dynamic flexural relaxation modulus is only 18% of the dynamic flexural relaxation modulus at room temperature.

On the other hand, the PPA sample retains high dynamic flexural relaxation modulus at high temperature. At 110° C. the dynamic flexural relaxation modulus of the PPA sample is 45% of the dynamic flexural relaxation modulus of polypropylene at room temperature. In comparison, the dynamic flexural relaxation modulus of polypropylene at 110° C. is only 8% of the dynamic flexural relaxation modulus of polypropylene at room temperature. For the PPA sample, the Dynamic Flexural Relaxation Performance is approximately 250% and the Dynamic Flexural Relaxation Temperature Performance is at least about 80° C.

In a further example not illustrated, a sample formed from a monoester derivative of an alkyl phosphonic acid having about 15-20 carbons in the alkyl chain retains high dynamic flexural relaxation modulus at high temperature. At 70° C. the dynamic flexural relaxation modulus of the monoester derivative sample is 100% of the dynamic flexural relaxation modulus of polypropylene at room temperature, and at 90° C., the dynamic flexural relaxation modulus of the monoester derivative sample is 44% of the dynamic flexural relaxation modulus of polypropylene at room temperature. In particular, the monoester derivative sample exhibits a Dynamic Flexural Relaxation Performance of at least about 135% and a Dynamic Flexural Temperature Performance of at least 80° C.

As illustrated in Table 4, the samples including coupling agents, such as OPA, PPA, and monoester derivatives thereof, exhibit an improvement in static flexural modulus at 90° C. of at least about 14% and as much as 41%.

On the other hand, OS-2 and Cyanex do not perform as well as PPA and the monoester derivative samples. While the mechanism is not fully understood, it is believed that a coupling agent including a phosphonic acid group or an ester derivative thereof provides improved qualities to a filler modified with such a coupling agent. Surprisingly, a coupling agent that includes phosphonic acid group and a benzyl group provides greater improvement in HDT than species having larger hydrocarbon groups, despite lower dispersion. Such performance has tentatively been attributed to the phosphonic acid group, and possibly, to the combination of the phosphonic acid group and a hydrocarbon group including a benzyl group. As such, the results clearly demonstrate that the structure and the type of surface treatment agents can have a dramatic effect on the mechanical performances of the composite material at high temperatures.

TABLE 5

Half Degradation Temperatures (HGT)

| Filler/<br>Coupling agent | Half degradation<br>temperature (° C.) | HGT<br>Performance (° C.) |
|---|---|---|
| None | 318.8 | N/A |
| Virgin CAM | 348.4 | 29.6 |
| PPA | 364.5 | 45.7 |
| OPA | 355.9 | 37.1 |
| OAP | 381.2 | 62.4 |

In addition to HDT, the samples exhibit desirable HGT. The degradation properties may be determined by measuring the composite weight loss by TGA during a heating ramp from room temperature to 800° C. at a rate of 10° C./min. As illustrated in Table 5, the HGT increases to 29° C. when the filler is the virgin CAM, by about 37° C. when it is surface modified by OPA. In addition, the HGT improves to more than 60° C. with the OAP sample. In monoester derivative samples (not illustrated), the HGT increases by about 53° C. Such performance may be attributable to the coupling agent as the composites with surface modified CAM demonstrate HGT elevated. Therefore, it appears that the nature of the surface treatment has a significant influence on the composite thermal stability.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A composite material comprising a non-polar polymer, alumina hydrate particulate, and a coupling agent, the composite material having a Heat Distortion Performance of at least about 10% relative to the non-polar polymer absent the alumina hydrate particulate, the coupling agent includes a hydrocarbon group and a polar functional group extending from the hydrocarbon group, the polar functional group includes a phosphinic acid group, a phosphonic acid group or an ester derivative thereof, a phosphoric acid or an ester derivative thereof, a sulphonic acid, or a sulfinic acid group.

2. The composite material of claim 1, wherein the polar functional group includes a phosphinic acid group, a phosphonic acid group or an ester derivative thereof and the hydrocarbon group comprising a phenyl group or a cyclic alkyl group.

3. The composite material of claim 1, wherein the non-polar polymer includes polyolefin.

4. The composite material of claim 1, wherein the composite material has a heat distortion temperature at least about 10° C. greater than the heat distortion temperature of the non-polar polymer absent the alumina hydrate particulate.

5. The composite material of claim 1, wherein the alumina hydrate particulate has an average longest particle dimension not greater than about 2000 nm.

6. The composite material of claim 1, wherein the alumina hydrate particulate has a $C_{BET}$ value not greater than about 110.

7. The composite material of claim 1, wherein the composite material exhibits a Dynamic Flexural Relaxation Performance of at least about 100% relative to the non-polar polymer absent the alumina hydrate.

8. The composite material of claim 1, wherein the composite material exhibits a Flexural Performance of at least 13%.

9. The composite material of claim 1, wherein the composite material includes about 3 wt. % to about 20 wt. % of the alumina hydrate particulate.

10. The composite material of claim 1, wherein the polar functional includes a phosphoric acid or an ester derivative thereof, a sulphonic acid, or a sulfinic acid group and the hydrocarbon group includes a long chain alkyl group, a benzyl group, a phenyl group, or a cyclic alkyl group.

11. The composite material of claim 1, wherein the composite material exhibits a Half deGradation Temperature (HGT) Performance of at least about 30° C.

12. A composite material comprising a non-polar polyolefin, alumina hydrate particulate, and a coupling agent, the alumina hydrate particulate having a longest particle dimension not greater than about 300 nm and an aspect ratio of at least about 3:1, the composite material exhibiting a heat distortion temperature at least about 10° C. greater than a heat distortion temperature of the non-polar polyolefin absent the alumina hydrate particulate, the coupling agent includes a hydrocarbon group and a polar functional group extending from the hydrocarbon group, the coupling agent including a phosphinic acid group, a phosphonic acid group or an ester derivative thereof, a phosphoric acid or an ester derivative thereof, a sulphonic acid, or a sulfinic acid group.

13. The composite material of claim 12, wherein the composite material has a Heat Distortion Performance of at least about 10%.

14. The composite material of claim 12, wherein the composite material exhibits a Dynamic Flexural Relaxation Performance of at least about 100% relative to the non-polar polyolefin absent the alumina hydrate.

15. The composite material of claim 12, wherein the composite material includes about 3 wt. % to about 20 wt. % of the alumina hydrate particulate.

16. The composite material of claim 12, wherein the coupling agent is a long chain alkyl or benzyl phosphonic acid or an ester derivative thereof.

17. The composite material of claim 12, wherein the polar functional group includes a phosphinic acid group, a phosphonic acid group or an ester derivative thereof and the hydrocarbon group comprising a phenyl group or a cyclic alkyl group.

18. The composite material of claim 12, wherein the polar functional includes a phosphoric acid or an ester derivative thereof, a sulphonic acid, or a sulfinic acid group and the hydrocarbon group includes a long chain alkyl group, a benzyl group, a phenyl group, or a cyclic alkyl group.

19. A method of forming a composite material, the method comprising:

mixing a non-polar polymer and an alumina hydrate particulate having a longest average particle dimension not greater than about 300 nm and a $C_{BET}$ value not greater than about 110, the alumina hydrate particulate having a coupling agent bonded to the surface, the coupling agent includes a hydrocarbon group and a polar functional group extending from the hydrocarbon group, the coupling agent including a phosphinic acid group, a phosphonic acid group or an ester derivative thereof, a phosphoric acid or an ester derivative thereof, a sulphonic acid, or a sulfinic acid group; and melt processing the mixture wherein the composite material has a heat distortion temperature at least about 10° C. greater than a heat distortion temperature of the non-polar polyolefin absent the alumina hydrate particulate.

20. The method of claim 19, wherein mixing the non-polar polymer and the alumina hydrate particulate includes mixing about 3 wt. % to about 20 wt. % of the alumina hydrate particulate with the non-polar polymer.

21. The method of claim 19 wherein the alumina hydrate particulate includes the coupling agent in an amount of about 2.0 micromoles/m$^2$ to about 6.0 micromole/m$^2$ based on the surface area of the alumina hydrate particulate.

* * * * *